Patented Apr. 4, 1944

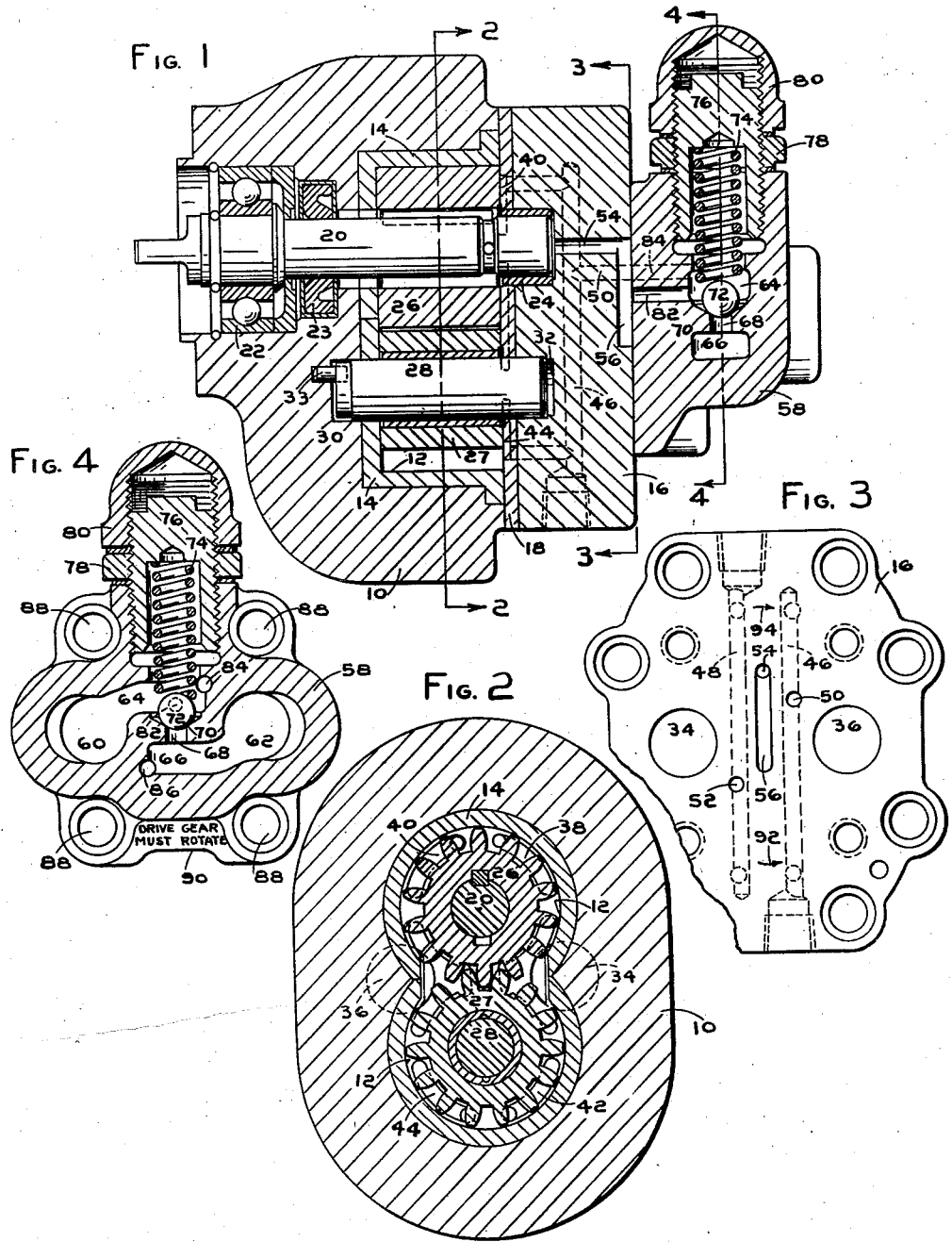

2,345,975

UNITED STATES PATENT OFFICE 2,345,975

POWER TRANSMISSION PUMP OR MOTOR

Kenneth R. Herman, Detroit, Mich., assignor to Vickers Incorporated, Detroit, Mich., a corporation of Michigan Application December 24, 1938, Serial No. 247,578

4 Claims. (Cl. 103—126)

This invention relates to power transmissions, particularly to those of the type comprising two or more fluid pressure energy translating devices one of which may function as a pump and another as a fluid motor.

The invention is particularly concerned with a fluid pressure energy translating device operable as a pump or a motor and which is particularly adapted for use in fluid power transmission systems aboard aircraft. As is well known, devices for such service are required to be of maximum lightness and reliability.

It is an object of the present invention to provide an improved gear pump or motor particularly adapted for aircraft service which is operable at high pressures with a long life and high reliability and which is relatively light in weight.

Further objects and advantages of the present invention will be apparent from the following description, reference being had to the accompanying drawing wherein a preferred form of the present invention is clearly shown.

In the drawing:

Figure 1 is a longitudinal cross section of a gear pump or motor incorporating a preferred form of the present invention.

Figure 2 is a section on line 2—2 of Figure 1.

Figure 3 is a section on line 3—3 of Figure 1.

Figure 4 is a section on line 4—4 of Figure 1.

Referring now to Figure 1, there is provided a pump body member 10 having a gear receiving chamber 12, the shape of which is seen in Figure 2. The gear chamber is provided with liners 14 rigidly secured to the body 10. An end plate 16 is removably secured to the right-hand face of the body 10 and has rigidly secured thereto a facing 18 which completes the lining of the gear chamber 12.

A drive shaft 20 is journalled on an antifriction bearing 22 provided with an oil seal 23 in the body member 10 and at its right-hand end is journalled in a bearing 24 in the end plate 16. Keyed to the shaft 20 is a drive gear 26 which lies within one-half of the gear chamber 12. Meshing with the gear 26 is an idler gear 27 journalled on a fixed shaft 28 positioned in bores 30 and 32 in the body 10 and end plate 16 respectively and anchored against rotation by a pin 33.

Referring to Figures 2 and 3, the end plate 16 is provided with suction and delivery passages 34 and 36 which connect to the spaces in the gear chamber on opposite sides of the meshing point of the two gears. These spaces may be termed suction and delivery ports.

Diametrically opposite these chambers there are provided in the facing 18 of the end plate 16 four balancing ports 38, 40, 42, and 44 of equal angular extent to the suction and delivery ports. The balancing chambers 40 and 44 are connected by a drilled conduit 46 while the chambers 38 and 42 are connected by a drilled conduit 48. As seen in Figure 3, the conduits 46 and 48 communicate with the right end face of the plate 16 by drilled passages 50 and 52. The latter are disposed non-symmetrically about a plane passing through the axes of the suction and delivery passages 34 and 36. A bore 54 is also formed in the end plate 16 connecting with the bearing 24 and forming a drain passage for oil seepage. This bore communicates with a milled groove 56 in the right end face of the plate 16.

Secured to the end plate 16 is an end cap 58 having incorporated therein a relief valve. The cap 58 has through passages 60 and 62 which connect with the passages 34 and 36 respectively and provide at the right hand end a means for connecting the device as a whole to suction and delivery piping.

The passage 60 has a branch extension 64 and the passage 62 has a branch extension 66 both of which are connected by a vertical passage 68 having a seat 70 at its upper end. A relief valve ball 72 rests on the seat 70 and is urged downwardly by a spring 74 the upper end of which is received in an adjusting screw 76 threaded into the end cap 58. Suitable lock and sealing nuts 78 and 80 are provided on the screw 76.

The extension 64 communicates with the slot 56 by a drilled connection 82. The extension 64 also communicates with the passage 50 by a drilled connection 84 while the extension 66 communicates with the passage 52 by a drilled connection 86.

The end cap 58 is provided with four bolt holes 88 which are symmetrically positioned about a central point just below the ball 72 and lying in the plane of symmetry of the passages 60 and 62. It will be seen that the end cap 58 may be mounted on the end plate 16 either in the position shown or in a position 180 degrees away from that shown. In either position the connection 82 will register with the slot 56 since, as seen in Figure 3, the latter extends below the central point above mentioned. In the position opposite to that shown, however, the register between connections 84 and 86 on the one hand and passages 50 and 52 on the other hand will be transposed. This subject matter is shown and claimed in Herman Patent No. 2,310,078, issued February 2, 1943. If desired the end cap may have a recess 90 in its periphery which will expose one or the other of two arrows 92 and 94 impressed on the end plate 16, thus forming an automatic indicator of the proper shaft rotation for either position of the end cap 58.

In constructing a device of this character for operation under pressures beyond one thousand pounds per square inch, the materials of which the various parts are made are largely determinative of success or failure. It is necessary that the clearances both at the tips of the gear teeth with the peripheral walls of the chamber and at the end faces of the gear teeth with the end walls of the chamber be maintained within extremely close limits over a wide range of temperature changes.

For purposes of lightness it is desirable that the larger parts of the mechanism at least be constructed of a light-weight material. All known light-weight materials commercially available have two disadvantages in that they possess a high coefficient of thermal expansion and are rather poor bearing material. Light-weight materials are also totally unsuited for use as gears since they lack the requisite hardness and strength to withstand the heavy loads encountered in such service.

In accordance with the present invention these difficulties are avoided by constructing the body member 10 and the end plate 16 of a light-weight alloy such as aluminum with a copper content of the order of four per cent. Such a material has a coefficient of expansion approximating .000012.

The liners 14 and the facing 18 are preferably formed from any suitable bearing bronze having requisite strength and bearing qualities. Many bronzes have a coefficient of expansion approximately the same as that for the aluminum alloy, above mentioned, one which has been found satisfactory being that known as "Ampco Metal," grade 18, having a composition approximately copper 84%, aluminum 12%, iron 4%, and a coefficient of expansion of approximately .000012.

The gears may be formed from a ferrous alloy commercially available as "Ni-Resist" which may be heat treated to a hardness approximating 250 Brinnell and which has a coefficient of expansion of the order of .000010. Such an alloy has an analysis substantially as follows: nickel, 14%; chromium, 6%; copper, 5.75%; silicon, 1.75%; carbon, 3.05%; manganese, .40%; phosphorus, .07%; remainder iron. Optionally the gears may be made of a stainless steel having approximately 18 per cent chromium and 8 per cent nickel. While such a steel possesses a satisfactory coefficient of expansion it is somewhat inferior to "Ni-Resist" in hardness.

This particular combination of materials provides a light-weight high-pressure pump or motor in which the clearances around the gears may be maintained at extremely small values under wide temperature variations and yet which is capable of continued operation at relatively high pressures.

The liners 14 and facing 18 are preferably secured to their respective backing members by a bonding process comprising sweating the pieces in position with a suitable solder or brazing material which forms an intimate bond between the bronze and aluminum alloy.

While the form of embodiment of the invention as herein disclosed, constitutes a preferred form, it is to be understood that other forms might be adopted, all coming within the scope of the claims which follow.

What is claimed is as follows:

1. A gear pump or motor comprising in combination a sectional body of light-weight alloy having a high coefficient of thermal expansion and having a gear chamber and inlet and outlet ports formed therein, a lining of bearing metal for said gear chamber intimately bonded to the body and having substantially the same expansion coefficient, and a pair of intermeshing gears in said chamber and formed of a hard ferrous alloy having an expansion coefficient substantially as great as that of the housing.

2. A gear pump or motor comprising in combination a sectional body of light-weight alloy having a high coefficient of thermal expansion and having a gear chamber and inlet and outlet ports formed therein, a lining of bronze for said gear chamber intimately bonded to the body and having substantially the same expansion coefficient, and a pair of intermeshing gears in said chamber and formed of a hard ferrous alloy having an expansion coefficient substantially as great as that of the housing.

3. A gear pump or motor comprising in combination a sectional body of light-weight alloy having a high coefficient of thermal expansion and having a gear chamber and inlet and outlet ports formed therein, a lining of bearing metal for said gear chamber intimately bonded to the body and having substantially the same expansion coefficient, and a pair of intermeshing gears in said chamber and formed of a hard ferrous alloy having substantially the characteristics of that known as "Ni-Resist."

4. A gear pump or motor comprising in combination a sectional body of light weight alloy having a high coefficient of thermal expansion and having a gear chamber and inlet and outlet ports formed therein, a lining of bearing metal for said gear chamber intimately bonded to the body and having substantially the same expansion coefficient, and a pair of intermeshing gears in said chamber having a hardness in excess of 250 Brinnell and an expansion coefficient substantially as great as that of the housing.

KENNETH R. HERMAN.